E. A. STREET.
Machine-Beltings.
No. 149,805. Patented April 14, 1874.
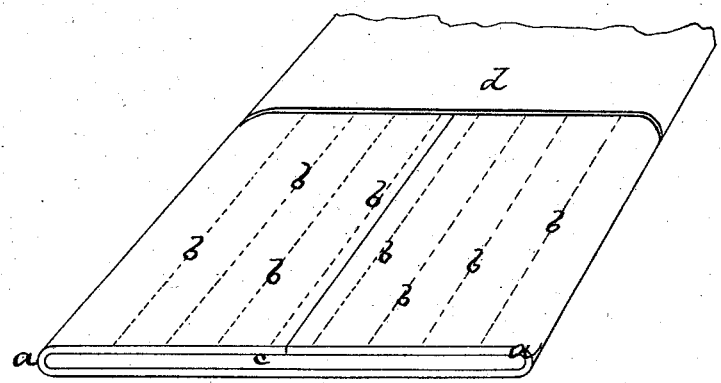
Witnesses.
M. W. Frothingham.
L. H. Latimer.
Inventor.
Edwin A. Street.
per Crosby & Gould.
Attys.

UNITED STATES PATENT OFFICE.

EDWIN A. STREET, OF LYNN, MASSACHUSETTS.

IMPROVEMENT IN MACHINE-BELTINGS.

Specification forming part of Letters Patent No. 149,805, dated April 14, 1874; application filed March 14, 1874.

*To all whom it may concern:*

Be it known that I, EDWIN A. STREET, of Lynn, in the county of Essex and State of Massachusetts, have invented an Improvement in Machine-Belting; and I do hereby declare that the following, taken in connection with the drawings which accompany and form part of this specification, is a description of my invention sufficient to enable those skilled in the art to practice it.

The invention has particular reference to the manufacture of belting from woven material, folded or arranged in layers, and united by parallel rows of continuous stitches.

In my invention, I coat the outer surface of the structure thus made, with india-rubber solution, and sometimes the inner or contiguous surfaces, and after thus coating or applying rubber or rubber compound or solution, I vulcanize the belt, the vulcanization effecting a perfect union of the folds or layers, and a smooth, elastic, and enduring coating for the outer surface of the belt. The invention consists of a belt thus formed of folds or layers of woven material, united by parallel rows of continuous stitches, the strips or layers being coated with rubber, and the layered, stitch-united, and rubber-coated structure being vulcanized to finish the belt.

The drawing represents a piece of belt formed of a strip of woven material, folded at *a*, and having the folds united by the rows of stitches *b*, the drawing showing an interior strip, *c*, inclosed within the main strip. The strips are covered or coated with rubber solution or rubber compound, and being thus covered and folded or assembled in layers, so as to form a structure of uniform width, having its parts united by stitches, the belt is vulcanized by the common methods of vulcanization, the vulcanized rubber between the layers forming a homogeneous connection of the respective parts, and the outer coating forming a smooth covering to the belt.

The structure thus made may be covered by a coating of rubber vulcanized over and with the rest of the structure.

I claim—

A machine-belt, made of woven material, formed or made in folds or layers, surfaced, united, and vulcanized, substantially as described.

EDWIN A. STREET.

Witnesses:
FRANCIS GOULD,
M. W. FROTHINGHAM.